(12) United States Patent
Leisner

(10) Patent No.: US 7,739,997 B2
(45) Date of Patent: Jun. 22, 2010

(54) REMOTE DRAIN AND FILTER ARRANGEMENT FOR A PORTABLE GENERATOR SYSTEM

(75) Inventor: John C. Leisner, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 218 days.

(21) Appl. No.: 11/511,116

(22) Filed: Aug. 28, 2006

(65) Prior Publication Data

US 2008/0047520 A1 Feb. 28, 2008

(51) Int. Cl.
*F01M 11/03* (2006.01)
*F01M 11/10* (2006.01)
*B23K 9/10* (2006.01)
*H05B 7/11* (2006.01)

(52) U.S. Cl. .............................. 123/196 R; 123/196 A; 123/196 S; 219/133

(58) Field of Classification Search ............. 123/196 R, 123/196 S, 196 A, 2, 200; 290/1 B, 1 A; 219/133; 184/1.5; 210/167.02, 167.04, 167.05
See application file for complete search history.

(56) References Cited

U.S. PATENT DOCUMENTS

| | | | |
|---|---|---|---|
| 3,871,483 A * | 3/1975 | Espinosa et al. ............. 184/1.5 |
| 4,492,632 A * | 1/1985 | Mattson ................. 210/167.05 |
| 4,676,206 A * | 6/1987 | DeGrazia, Jr. ........... 123/196 S |
| 4,951,784 A * | 8/1990 | Bedi ........................... 184/1.5 |
| 4,977,978 A * | 12/1990 | Batrice ........................ 184/1.5 |
| 5,039,406 A * | 8/1991 | Whittington ........... 210/167.02 |
| 5,044,334 A * | 9/1991 | Bedi ....................... 123/196 R |
| 5,298,158 A * | 3/1994 | Anderson ............. 210/167.04 |
| 5,386,881 A * | 2/1995 | Eshelman .................... 184/1.5 |
| 5,467,746 A * | 11/1995 | Waelput et al. ......... 123/196 A |
| 5,787,372 A * | 7/1998 | Edwards et al. ............... 701/29 |
| 6,003,635 A * | 12/1999 | Bantz et al. ................. 184/1.5 |
| 6,145,623 A * | 11/2000 | Cordes ....................... 184/1.5 |
| 2003/0155339 A1* | 8/2003 | Gitter et al. ................. 219/133 |

* cited by examiner

*Primary Examiner*—Noah Kamen
(74) *Attorney, Agent, or Firm*—Fletcher Yoder

(57) ABSTRACT

A remote drain and filter arrangement for a portable engine-driven generator is disclosed that positions the oil filter and oil drain at a location outside the enclosure of the generator. The arrangement generally consists of an oil filter assembly and oil drain assembly. The oil filter assembly includes an oil filter adapter used to interface with the oil filter and is coupled to the engine via oil conduits. The oil drain assembly includes an oil drain conduit and a flow control device that allows the oil to be drained from a location outside of the enclosure of the generator. A pump can be used to allow for sufficiently longer oil conduits. The invention is retrofittable to current engine-driven generators and can also be incorporated into future designs.

17 Claims, 5 Drawing Sheets

REMOTE DRAIN AND FILTER ARRANGEMENT FOR A PORTABLE GENERATOR SYSTEM

BACKGROUND

The invention relates generally to the field of portable engine-driven generators. More specifically, the inventions relates to a remote drain and filter arrangement that is used for an engine-driven generator or an engine-driven welder.

Portable engine-driven generators are commonly used to provide electrical power in locations where conventional electrical power is not readily available. Both gasoline and diesel engines are used to drive such generators, and the power produced is typically either 120 VAC or 240 VAC. One specific generator application is for welding processes and these units are commonly known as portable engine-driven welders. These units include a control system to regulate the power produced by the generator thereby making it suitable for an arc welding operation. Typical welding operations for which these units are intended include stick electrode welding, MIG welding, TIG welding, or plasma torch cutting.

One issue with engine-driven generators and engine-driven welders relates to their weight and the positioning of the unit in order to perform routine oil changes and other engine maintenance. These units are relatively heavy, some weighing over 500 pounds, and are typically mounted in a truck bed or other motor vehicle making them more transportable. Given that space is limited in these vehicles, the unit usually is placed adjacent to the cab of the vehicle and/or surrounded by permanently mounted tool boxes or other built-in structures of the vehicle. Moreover, the engine and generator are typically fully enclosed by an enclosure and servicing the engine becomes difficult because direct access is at best very limited. Such systems are fully enclosed for several reasons, such as to protect the engine and generator form dust, debris, and rough handling. Also, the enclosure reduces noise and helps to cool the engine by preventing hot air recirculation when the welder is placed in service. All of these benefits lead to longer component and engine life. In short, the benefits provided by full enclosure far outweigh the current inconveniencies of servicing the engine in these space constrained environments.

However, engine maintenance is critical to engine performance and is a task that must be performed at regular intervals. Given the required regularity of the engine maintenance, the current inconveniencies of performing engine service can become a major issue for the user. Currently, access to the serviceable components is often gained through a removable panel located in a side wall of the enclosure. As alluded to above, the location of this panel is often blocked by nearby tool boxes or other structures. In this situation, the user is required to relocate or reposition the unit in order to gain access to the serviceable components via the removable panel. Given the weight of the unit, this can be a very time consuming and arduous task. While certain facilities have been provided by the ability to relocate oil filter and drain locations within the enclosure, even these do not alleviate the need to access the interior via panels and the like.

Thus, there is a need for quickly and easily accessing serviceable engine components in portable generators and welders without requiring relocation or repositioning of the unit. This would not only save time and money but would have a secondary effect of promoting regular maintenance by reducing the difficulty in performing the service. Furthermore, it would be advantageous if the serviceable components could be positioned so that they did not increase the space or volume occupied by the unit. Finally, it would be very beneficial to provide such access in a kit that is retrofittable to current engine-driven welders and engine-driven generators.

BRIEF DESCRIPTION

The current invention offers a unique, cost effective, and time saving solution to the inconveniencies created in servicing engine-driven generators and engine-driven welders. The invention generally consists of a kit that allows the oil filter to be positioned outside the enclosure of the generator. The kit includes an oil filter adapter that is used to interface with the oil filter and is coupled to the engine via oil conduits. The oil conduits allow the engine oil to be circulated between the engine and the filter. The kit further includes an oil drain conduit allowing the oil to be drained from a location outside of the enclosure. The kit can be mounted to the external portion of the enclosure or to a support surface on a vehicle. Furthermore, the space required to implement the engine driven welder can be reduced by mounting the oil adapter and oil drain conduit directly to the vehicle. The user can increase the functionality of the kit by incorporating a pump between the filter and engine, where desired.

Thus, the kit allows for tremendous flexibility in positioning these serviceable components, thereby allowing the user to choose the optimum configuration for their given situation. Furthermore, the current invention completely eliminates the need for the user to relocate or reposition the unit when performing an oil change. Thus, maintaining the engine is no longer a difficult and time consuming task, which leads to a secondary benefit of promoting regular engine maintenance. The current invention is completely retrofittable so that the user is not required to purchase a new generator or welder to enjoy the benefits offered by the current invention. Finally, the current invention can be incorporated into future designs and provided at the time of manufacturing.

DRAWINGS

These and other features, aspects, and advantages of the current invention will become better understood when the following detailed description is read with reference to the accompanying drawings in which like characters represent like parts throughout the drawings, wherein.

DETAILED DESCRIPTION

Figure 1:
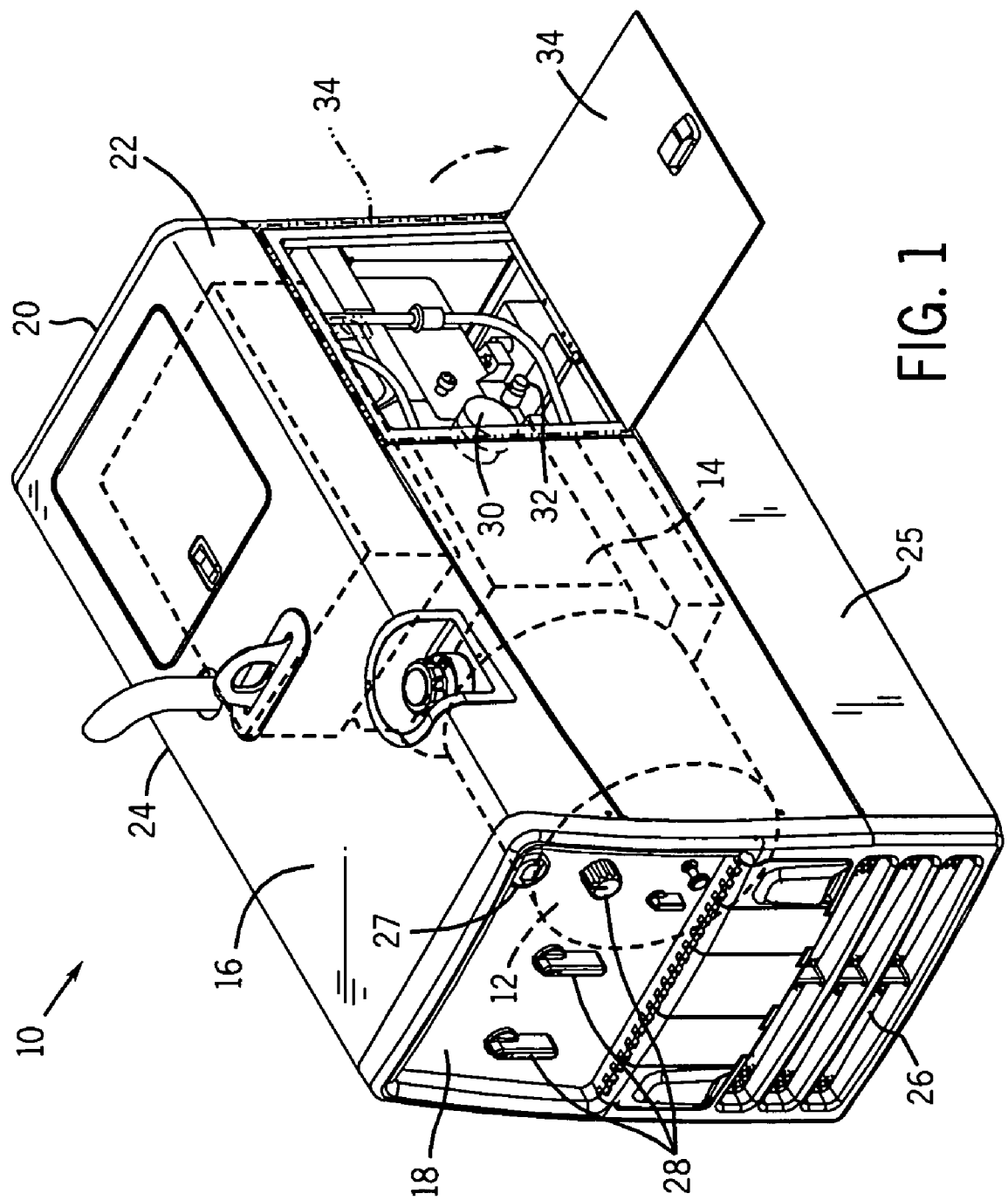
FIG. 1 is a perspective view of an engine-driven welder illustrating the location of the oil filter and oil filter drain when installed without the current invention, and as such these components are shown contained within the interior volume of the enclosure.

Turning now to the drawings, FIG. 1 illustrates the relevant elements of the engine-driven welder when the current invention is not used and all of the elements are located inside the enclosure. The engine-driven welder 10 includes an electrical power generator 12 that is coupled to and driven by an engine 14. The engine can be either a gasoline or diesel engine. Other engines may also be used for this purpose, including liquefied petroleum gas engines The engine and generator are fully enclosed by an enclosure 16. The enclosure consist of a front panel 18, a rear side 20, a right side 22, and a left side 24, all engaging a base 25 to complete the enclosure. The enclosure protects the engine and generator form dust, debris, and rough handling. The enclosure also reduces noise and helps to cool the engine by preventing hot air recirculation via the cool air inlet 26 pulling air through the interior volume of the enclosure.

A control system regulates the electrical power supplied by the generator and allows for it to be used for welding process. The front panel has maintenance displays 27 and range controls 28 that allow a user to interact with the control system. The range controls allow the user to select the proper regulated energy output to conduct a range of arc welding processes, such as stick electrode welding, MIG welding, TIG welding, or power generation. The maintenance displays allow the control system to alert the user when the engine needs servicing and/or an oil change is required.

The engine oil filter 30 mounts directly to the engine and is contained within the enclosure the current invention is not used. The oil drain 32 is located in close proximity to the oil filter and is also contained within the enclosure. Both the oil filter and oil drain are accessible via a removable panel 34 located in the right side of the enclosure. As will be discussed in more detail below, access to this panel and the engine located inside the enclosure can be difficult when the welder is mounted in a manner such that this panel is not accessible, or the internal components of the enclosure are difficult to access even if the panel can be removed or displaced. In this instance, the user is given the laborious task of repositioning and relocating the unit in order to service the engine.

Figure 2:
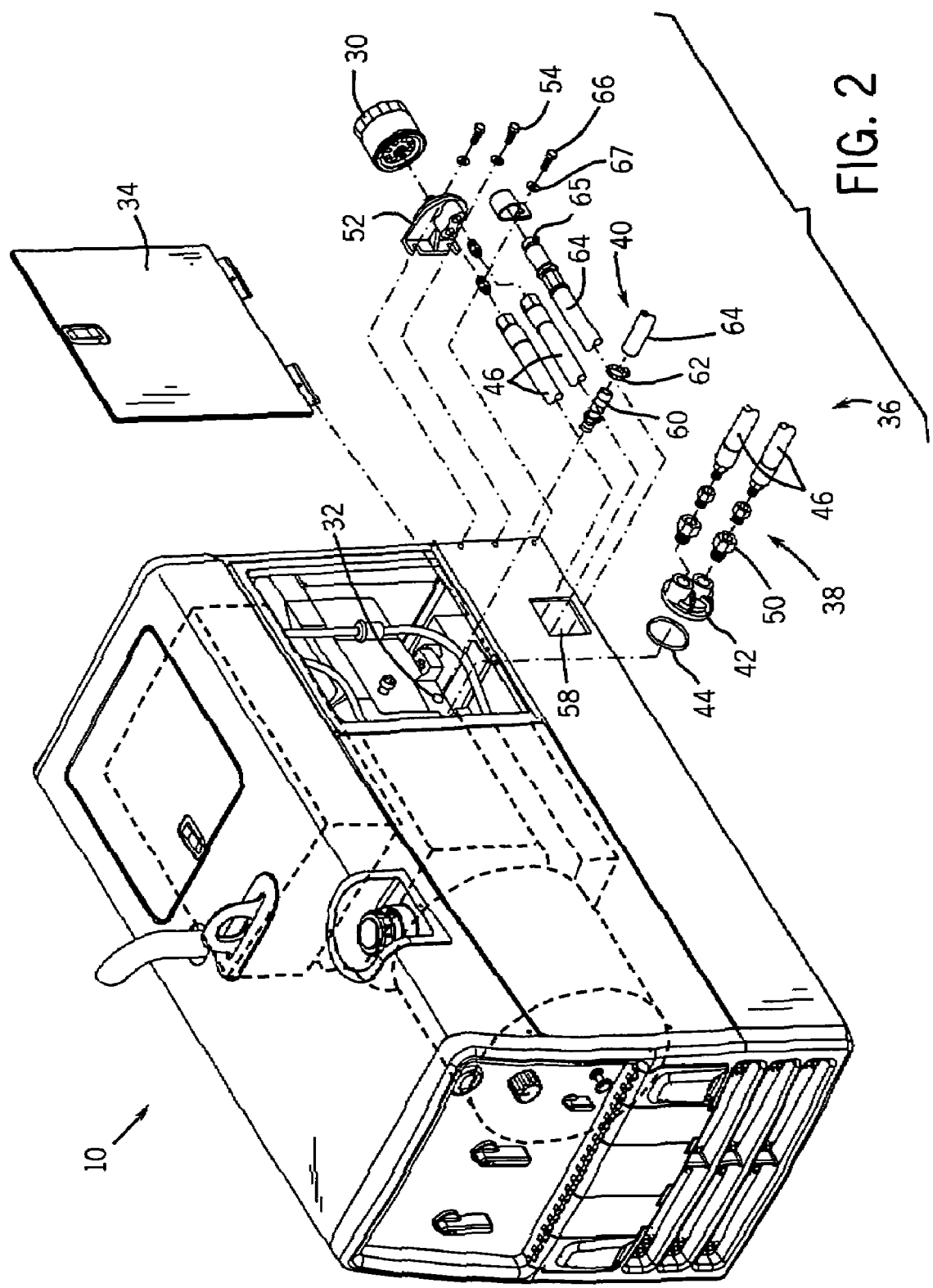
FIG. 2 is perspective view of an engine-driven welder illustrating the location of the oil filter and oil filter drain when installed with the current invention, and as such they are positioned outside the enclosure.

FIG. 2 illustrates an engine-driven welder and the location of the relevant components when the current invention is implemented. In one aspect, the current invention is a kit 36 that can be subdivided into an oil filter assembly 38 and oil drain assembly 40. The oil filter assembly includes an engine adapter 42 that mounts directly to the engine where the oil filter was mounted. An o-ring 44 is used to hydraulically seal the adapter to the engine. Two oil conduits 46 engage and seal to the engine mount adapter via hydraulic fixturing 50. The conduits are coupled to the oil filter 30 via an oil filter adapter 52. The oil filter adapter is configured to accept and seal to an oil filter. The oil filter adapter can be mounted to the external portion of the enclosure via a plurality of fasteners 54. The oil conduits are routed to the oil filter adapter via a base panel 58 located in right side of the enclosure. Those skilled in the are will appreciate the oil adapter does not necessarily have to be mounted to the enclosure and can be mounted at any location that is external to the enclosure, as will be discussed in more detail below. Furthermore, the conduits do not have to be routed in the manner illustrated in the figure and can be adjusted as necessary. For example, the conduits could be routed through the rear side of the welder or even through the bottom of the base. Thus, one of the novelties of the current inventions is that it allows the user to customize the layout of the service components (i.e., oil filter and drain) for their application or installation.

In a typical oil service procedure, the oil filter is replaced during an oil change, and the oil itself is drained and replaced. Thus, the current invention also provides the added benefit of a remote drain. The oil drain assembly 40 can be positioned in the same manner as the oil filter adapter and includes a barbed fitting 60, conduit clamp 62, oil drain conduit 64, and a flow control device 65. The flow control device will generally include a small, manual shut off valve or cock, although a simple plug or cap may serve in certain applications. The barbed fitting couples the oil drain conduit to the oil engine drain 32. The oil drain conduit is secured to the barbed fitting via the conduit clamp. The flow control device is located on the opposite end of the oil drain conduit and allows the user to drain the oil from a location outside of the enclosure. The oil drain conduit can be mounted to the external portion of the enclosure via a fastener 66 and mounting bracket 67. The oil drain conduit is routed to the mounting bracket via the base panel 58 located in right side of the enclosure. As discussed above, this mounting and routing configuration is not the only possible configuration and the current invention allows great flexibility in allowing the user to customize the layout to their specific needs.

Figure 3:
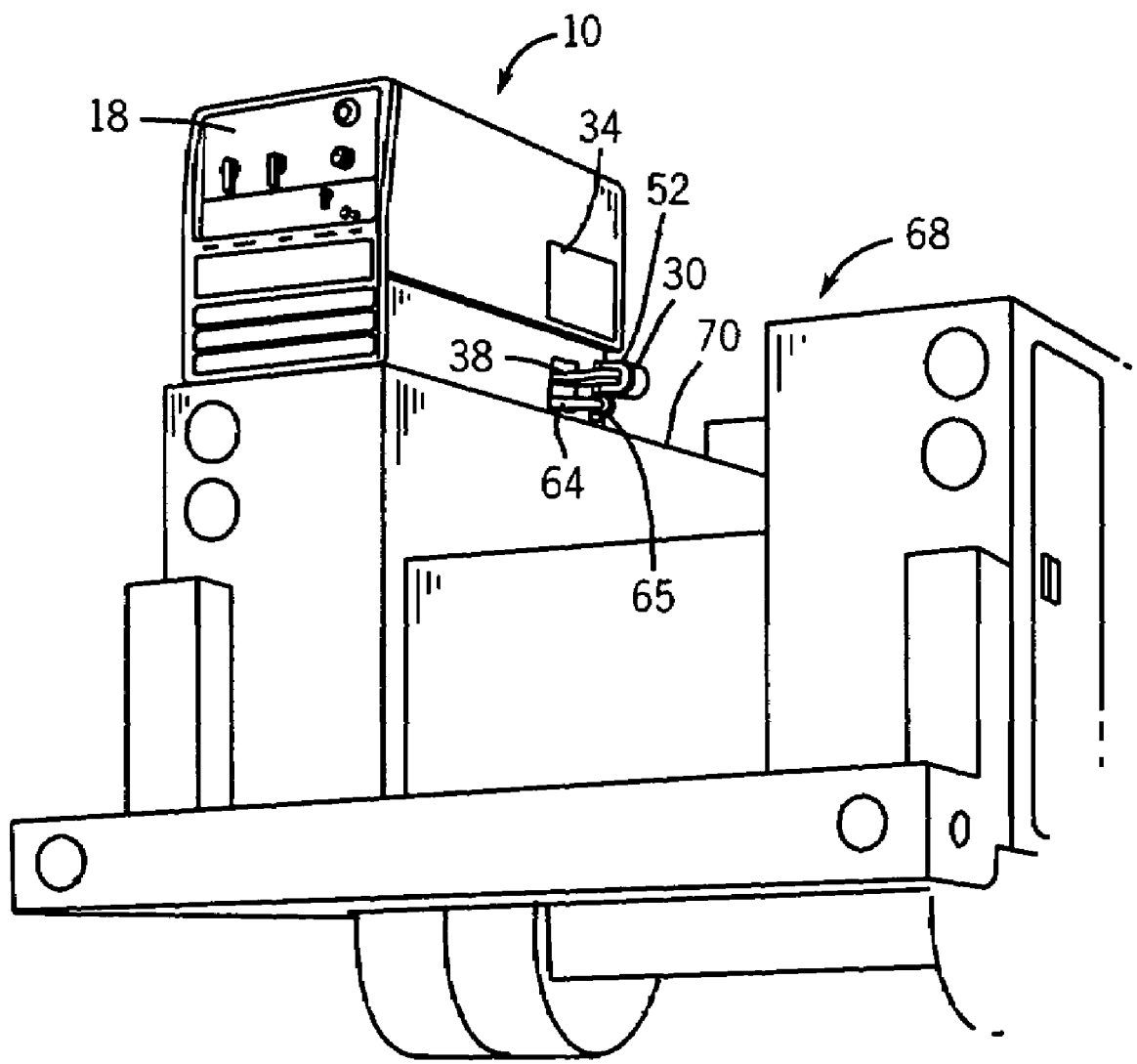
FIG. 3 is a perspective view on an engine-driven welder mounted on the back side of a vehicle, and further illustrating the accessibility of the oil filter and oil filter drain when they are positioned outside the enclosure.

FIG. 3 illustrates a perspective view on the engine-driven welder 10 mounted on the back side of a vehicle 68. The welder is shown mounted on top of a side panel of the vehicle. Those skilled in the art will appreciate the accessibility of the oil filter 30 and flow control device 65 when these serviceable elements are positioned outside the enclosure as is illustrated in the figure. The user can easily service the engine by simply draining the oil from the engine via the flow control device and replacing the filter mounted to the oil filter adapter 52. Thus, even in instances where the removable panel 34 is inaccessible or difficult to access the current invention offers a number of time saving conveniences for the user.

Figure 4:
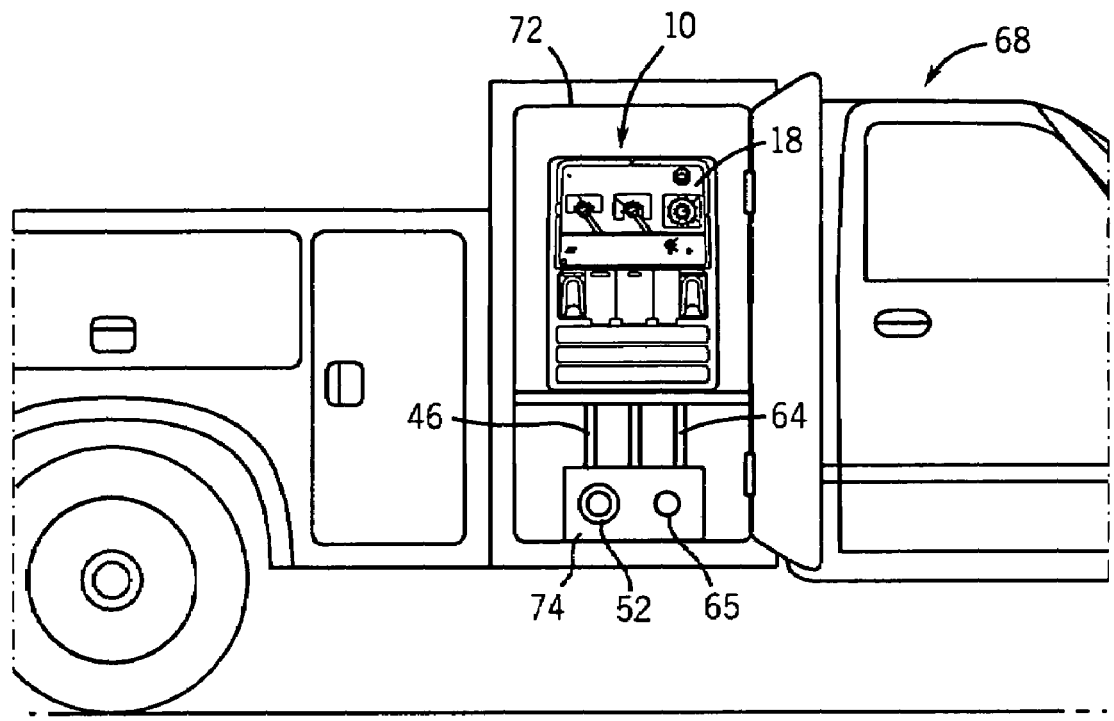
FIG. 4 is frontal view of the engine-driven welder positioned in a compartment having the oil filter and oil filter drain attached to a support surface of the vehicle.

FIG. 4 illustrates a configuration where the removable panel would not be as easily accessed and would make it difficult for the user to service the engine. The figure illustrates the engine-driven welder mounted in a compartment 72 of the vehicle 68. This configuration might be implemented when the user wants to secure the engine-driven welder in a locked compartment to protect it from theft and the elements. The figure further illustrates the flexibility that the current invention provides by showing the oil filter adapter 52 and flow control device 65 mounted to a support surface 74 on the vehicle. This configuration offers all of the advantages as before, particularly easy access to the oil filter and oil drain. Thus, the user can service the engine in a fast and efficient manner without having to relocate or reposition the welder to gain access to the removable panel.

Figure 5:
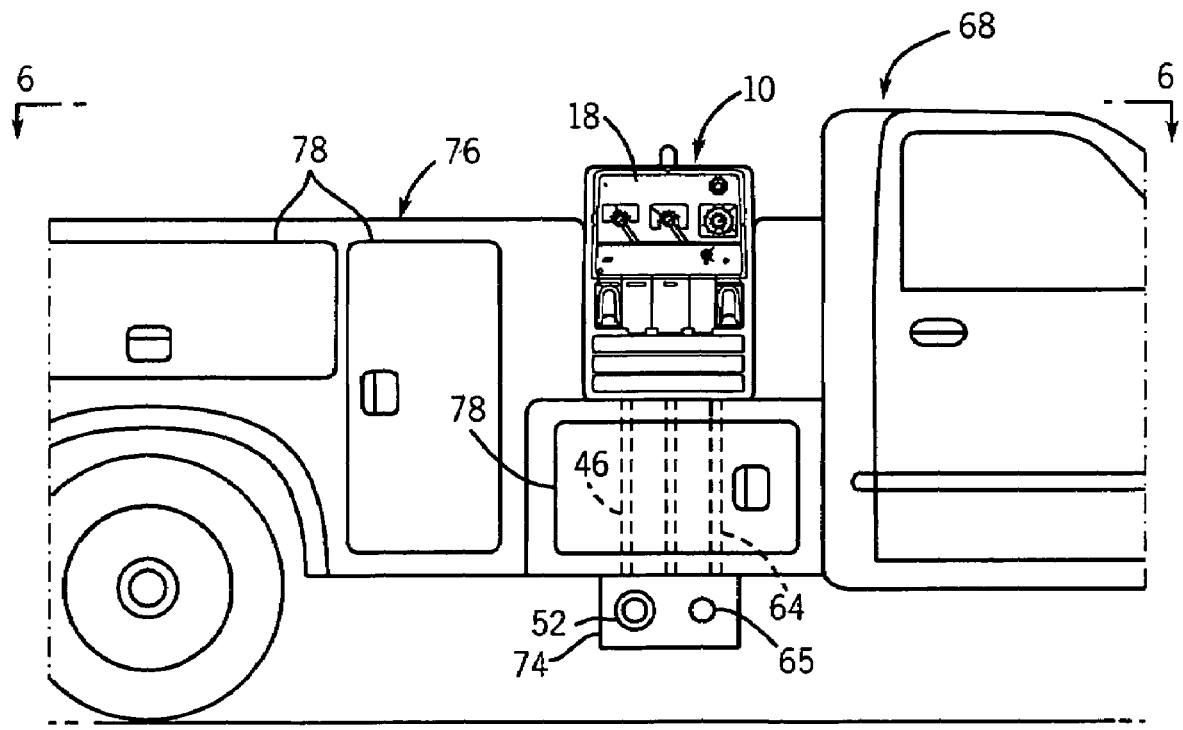
FIG. 5 is an alternate configuration of the engine-driven welder positioned on a vehicle with the oil filter and oil filter drain mounted beneath the vehicle.
Figure 6:
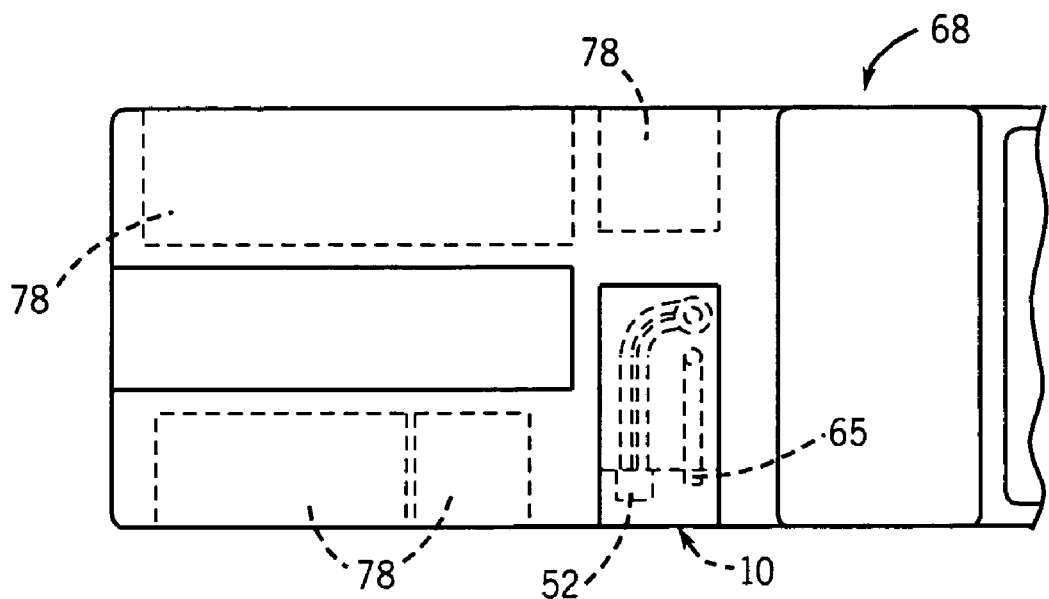
FIG. 6 is a top view of the vehicle in FIG. 5, viewed along lines 6-6, illustrating one possible configuration for positioning the engine-driven welder on the vehicle, and further illustrating the space advantages offered by using the current invention.

FIG. 5 illustrates another common configuration where the oil filter and oil drain are not easily accessible. The figure illustrates the engine-driven welder integrated into the compartment structure 76 of the vehicle 68. As discussed above, space is often critical on these vehicles due to the number of tools and supplies required by the user to perform the requisite job functions. These tools and supplies have to be carried between job sites and are often stored in compartments 78 to protect them from theft and the elements. The figure illustrates how the current invention allows the user to reduce the required space for the engine-driven welder while still allowing the user easy access to the oil filter and oil drain. In this configuration the oil filter adapter 52 and flow control device 65 are attached to a support surface mounted beneath the vehicle. FIG. 6 is a top view of the vehicle when viewed from line 6-6 of FIG. 5. Those skilled in the art will appreciate that this configuration allows the user to maximize compartment space in the vehicle because it does not require extra space to access the oil filter and oil drain by positioning these serviceable components beneath the vehicle.

Figure 7:
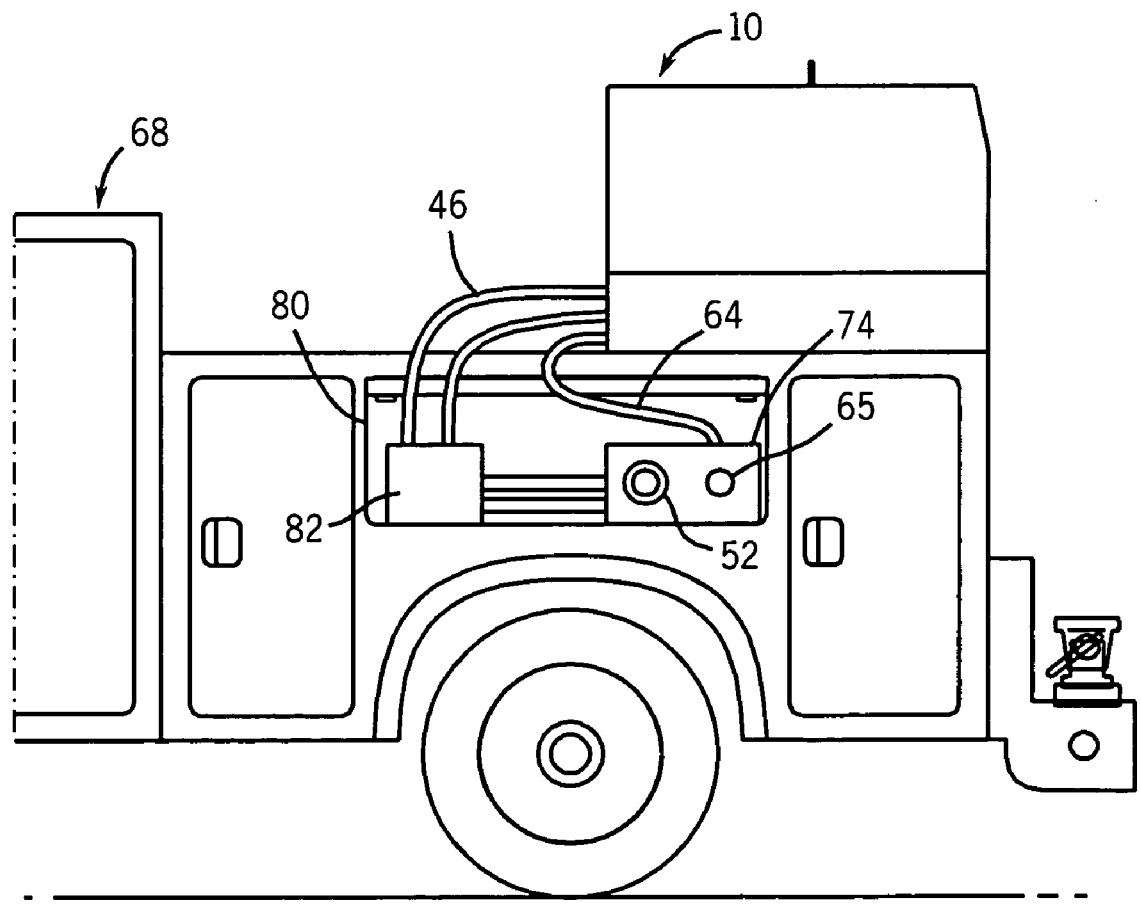
FIG. 7 is a side view of the mounting configuration shown in FIG. 3, illustrating an alternate implementation of the current invention that incorporates a pump to enable positioning the oil filter a significant distance from the engine-driven welder.

FIG. 7 illustrates a configuration where the oil conduits are sufficiently long enough to make use of a pump to circulate the oil through the filter. The figure shows a similar configuration to the one shown in FIG. 3, where the engine-driven welder 10 is mounted on the back side of the vehicle 68. The oil filter adapter 52 and flow control device 65 are mounted to a support surface 74 contained within a compartment 80 of the vehicle. A pump 82 is placed in line with the oil filter adapter and engine to circulate the oil. Those skilled in the art will appreciate that this configuration allows the user the flexibility of mounting the serviceable components practically anywhere on the vehicle.

As discussed, the current invention is not functionally limited to the exact configurations illustrated. Instead, these figures only illustrate a few of the many possible configurations and help to demonstrate the tremendous flexibility of the current invention. The figures functionally illustrate a common situation where access to the engine is limited and show a few examples on how the current invention can be implemented to allow for routine engine maintenance without relocating or repositioning the unit. The result is a significant savings in time and money by making this maintenance process more efficient. Furthermore, the current invention makes performing these routine oil changes very simple, which will encourage regular maintenance, thereby prolonging engine life. Finally, the flexibility of the current invention allows for the oil filter and oil drain to be positioned in a location that is most space efficient for the user. Thus, not only does the current invention reduce the time and effort required to perform engine maintenance, but also allows the user to take full advantage of limited space constraints by positioning serviceable elements in what was previously non-functional space. In addition, the functionality of the current invention is not limited to oil filters and oil drains, but can used for a number of maintenance components, such as air or gasoline filters by using a similar technique to locate these components outside of the enclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A portable engine-driven generator, comprising:
   an electrical power generator;
   an engine coupled to the electrical power generator to drive the electrical power generator to produce electric power;
   an enclosure surrounding both the engine and electrical power generator in an interior volume enclosed by an outer wall;
   an oil filter adapter external to the enclosure, wherein the oil filter adapter comprises a filter interface configured to support an engine oil filter in a filter region external to the enclosure, and the outer wall separates the filter region from the interior volume;
   oil filter conduits extending between the oil filter adapter and the engine; and
   an oil drain conduit extending between an engine oil drain of the engine and an external drain disposed in a drain region external to the enclosure, and the outer wall separates the drain region from the interior volume.

2. The portable engine-driven generator of claim 1, wherein the interior volume of the enclosure is accessible via a plurality of removable panels for retrofitting the oil filter and oil drain conduits to the engine.

3. The portable engine-driven generator of claim 1, further comprising a flow control device coupled to the oil drain conduit for interrupting flow of oil through the drain conduit.

4. The portable engine-driven generator of claim 1, wherein the oil filter adapter is configured to be rigidly mounted to a support surface of a vehicle in which the engine-driven generator is mounted, wherein the support surface is separate from the enclosure.

5. The portable engine-driven generator of claim 1, wherein the oil drain conduit is configured to be rigidly mounted to a support surface of a vehicle in which the engine-driven generator is mounted, wherein the support surface is separate from the enclosure.

6. The portable engine-driven generator of claim 1, wherein the generator produces 120 VAC and 240 VAC.

7. The portable engine-driven generator of claim 1, further comprising a pump to circulate the oil from the engine to the oil filter.

8. The portable engine-driven generator of claim 7, wherein the oil filter conduits are sufficiently long to permit the oil filter to be mounted beneath a vehicle in which a welder is mounted.

9. The portable engine-driven generator of claim 1, wherein the oil drain conduit comprises a drain outlet that is separate from the engine oil filter.

10. The portable engine-driven generator of claim 1, wherein the oil filter adapter is mounted to an exterior surface of the outer wall and/or protrudes outwardly from the exterior surface of the outer wall.

11. A portable engine-driven welder, comprising:
    an electric power generator;
    an engine coupled to the electrical power generator to drive the electrical power generator to produce electric power;
    a welding control system configured to regulate the electric power to produce a welding power;
    an enclosure surrounding both the engine and electrical power generator in an interior volume enclosed by an outer wall; and
    an external oil service retrofit kit configured to position an oil service region external to the enclosure, the retrofit kit comprising:
      an external service oil filter adapter configured to support an engine oil filter in a filter region external to the enclosure, and the outer wall separates the filter region from the interior volume;
      oil filter conduits configured to extend through the outer wall between the external service oil filter adapter and the engine; and
      an oil drain conduit configured to extend through the outer wall from an engine oil drain of the engine to an external drain at a drain region external to the enclosure, and the outer wall separates the drain region from the interior volume.

12. The portable engine-driven welder of claim 11, further comprising a flow control device coupled to the oil drain conduit for interrupting flow of oil through the drain conduit.

13. The portable engine-driven welder of claim 11, wherein the external service oil filter adapter is configured to be rigidly mounted to a support surface of a vehicle in which the engine-driven generator is mounted, wherein the support surface is separate from the enclosure.

14. The portable engine-driven welder of claim 11, wherein the oil drain conduit is configured to be rigidly mounted to a support surface of a vehicle in which the engine-driven generator is mounted, wherein the support surface is separate from the enclosure.

15. The portable engine-driven welder of claim 11, wherein the oil filter conduits are sufficiently long to permit the oil filter to be mounted beneath a vehicle in which the welder is mounted.

16. The portable engine-driven welder of claim 11, wherein the oil drain conduit comprises a drain outlet that is separate from the oil filter.

17. The portable engine-driven welder of claim 11, wherein the external service oil filter adapter is configured to be mounted to an exterior surface of the outer wall and/or to protrude outwardly from the exterior surface of the outer wall.

* * * * *